(12) United States Patent
    Ikeda

(10) Patent No.: US 10,616,448 B2
(45) Date of Patent: Apr. 7, 2020

(54) IMAGE PROCESSING APPARATUS PERFORMING COLOR CONVERSION PROCESS THAT REFLECTS INTENTION OF ORIGINAL COLOR SCHEME, AND CONTROL METHOD THEREFOR

(71) Applicant: CANON KABUSHIKI KAISHA, Tokyo (JP)

(72) Inventor: Sanae Ikeda, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/874,045

(22) Filed: Jan. 18, 2018

(65) Prior Publication Data
    US 2018/0249043 A1    Aug. 30, 2018

(30) Foreign Application Priority Data

Feb. 24, 2017  (JP) ................. 2017-033523

(51) Int. Cl.
```
H04N 1/60      (2006.01)
H04N 1/405     (2006.01)
H04N 1/40      (2006.01)
H04N 1/407     (2006.01)
H04N 1/56      (2006.01)
```
(52) U.S. Cl.
    CPC .......... H04N 1/6072 (2013.01); H04N 1/405 (2013.01); H04N 1/40012 (2013.01); H04N 1/4072 (2013.01); H04N 1/56 (2013.01); H04N 2201/0082 (2013.01)

(58) Field of Classification Search
    CPC .......... H04N 1/40012; H04N 1/40062; H04N 1/407; H04N 1/4072; H04N 1/56; H04N 1/60; H04N 1/6027; H04N 1/6072; H04N 1/644; G06T 7/90; G06T 11/001; G06K 15/1868; G06K 15/1878; G06K 9/4652
    See application file for complete search history.

(56) References Cited

U.S. PATENT DOCUMENTS

| 7,860,310 B2 * | 12/2010 | Yamamoto ........... H04N 1/4074 382/173 |
| 2004/0080789 A1 * | 4/2004 | Anderson .......... H04N 1/40012 358/2.1 |
| 2006/0077406 A1 * | 4/2006 | Bhattacharjya ...... H04N 1/6027 358/1.9 |

(Continued)

FOREIGN PATENT DOCUMENTS

JP    2013125434 A    6/2013

*Primary Examiner* — Scott A Rogers
(74) *Attorney, Agent, or Firm* — Rossi, Kimms & McDowell LLP

(57) ABSTRACT

An image processing apparatus that is capable of converting an original color image into a monochrome image to which color scheme intention of the original color image is reflected appropriately. An extraction unit extracts colors used for characters and figures in color data. A first determination unit determines one of the colors as a base color. A second determination unit determines another of the colors as an accent color. An application unit converts the color data into monochrome data by applying a predetermined gray to the base color determined and applying a gray that is distinguishable from the predetermined gray and has a density higher than the predetermined gray to the accent color.

12 Claims, 15 Drawing Sheets

(56) References Cited

U.S. PATENT DOCUMENTS

| | | | | |
|---|---|---|---|---|
| 2007/0024656 A1* | 2/2007 | Nakamura | ......... | H04N 1/40012 347/15 |
| 2008/0107331 A1* | 5/2008 | Kojima | ..................... | G06T 7/90 382/162 |
| 2008/0292204 A1* | 11/2008 | Itoh | .................... | H04N 1/40012 382/266 |
| 2009/0109451 A1* | 4/2009 | Sawada | ................... | H04N 1/56 358/1.9 |
| 2011/0141501 A1* | 6/2011 | Shirata | ............... | H04N 1/40062 358/1.9 |
| 2013/0044949 A1* | 2/2013 | Ono | .................. | H04N 1/40012 382/167 |

* cited by examiner

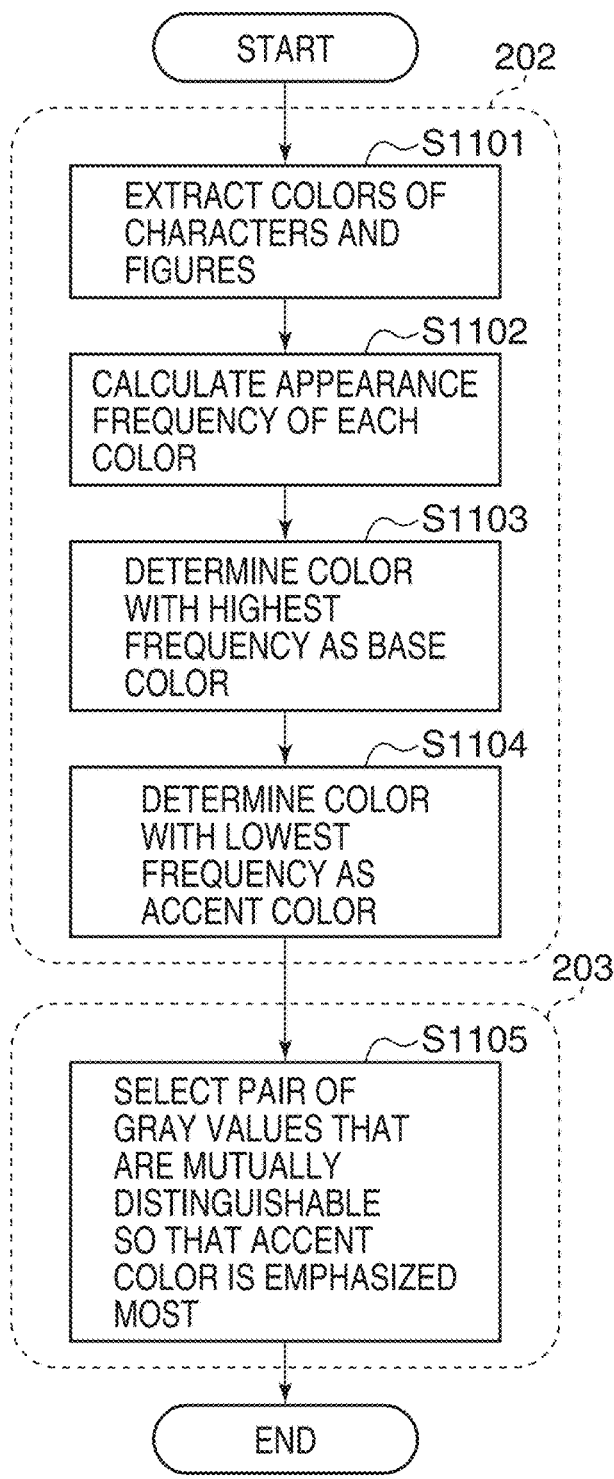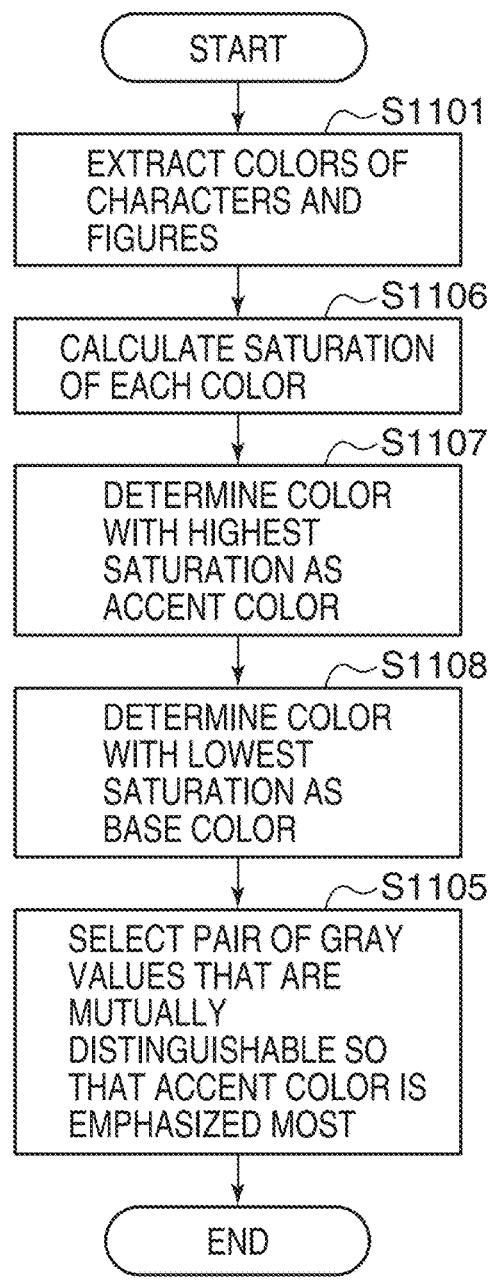

FIG. 12A

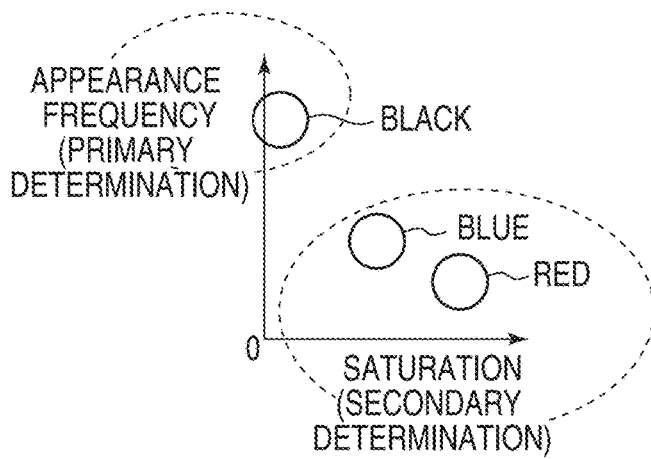

APPEARANCE FREQUENCY (PRIMARY DETERMINATION)

BLACK

BLUE
RED

SATURATION (SECONDARY DETERMINATION)

FIG. 12B
(COLOR-SCHEME-POLICY INFORMATION) 205

| | DETERMINING TARGET COLORS | APPEARANCE FREQUENCY | SATURATION | ROLE | THE NUMBER OF DETERMINING TARGET COLORS |
|---|---|---|---|---|---|
| 1201 | BLACK | 8(HIGH) | LOW | BASE | 3 |
| 1202 | BLUE | 4(MEDIUM) | MEDIUM | MAIN | |
| 1203 | RED | 2(LOW) | HIGH | ACCENT | |

FIG. 12C
(COLOR-SCHEME-POLICY REPRODUCTION INFORMATION) 206

| | TARGET COLORS | ROLE | REPRODUCTION ROLE | | APPLIED GRAY |
|---|---|---|---|---|---|
| 1211 | BLACK | BASE | BASE | MEDIUM | 60 % |
| 1212 | BLUE | MAIN | DECORATION | THIN | 40 % |
| 1213 | RED | ACCENT | EMPHASIS | THICK | 100 % |

```
1 Page Start
2 Set color (0,0,255)→"BLUE"
3 Draw Box(x1,y1,x2,y2,w,h)

4 Set Text Size (18)
5 Set color (0,0,255)→"BLUE"
6 Draw Text("A")
7 Draw Text("I")
8 Draw Text("U")

9 Set Text Size (12)
10 Set color (0,0,0)→"BLACK"
11 Draw Text("A")
12 Draw Text("B")
13 Draw Text("C")
14 Draw Text("D")
15 Draw Text("E")

16 Set color (255,0,0)→"RED"
17 Draw Text("F")
18 Draw Text("G")

19 Set color (0,0,0)→"BLACK"
20 Draw Text("H")
21 Draw Text("I")
22 Draw Text("J")

23 Page End
```

IMAGE PROCESSING APPARATUS PERFORMING COLOR CONVERSION PROCESS THAT REFLECTS INTENTION OF ORIGINAL COLOR SCHEME, AND CONTROL METHOD THEREFOR

BACKGROUND OF THE INVENTION

Field of the Invention

The present invention relates to an image processing apparatus that performs a color conversion process in a case where color data is printed monochromatically, and a control method therefor.

Description of the Related Art

A presentation document that is projected to a screen using a projector has been created as a full-color document generally. Furthermore, an important portion, a frame, a ruled line, and a character decoration like an underline are often represented in chromatic colors even in a document based on black characters in recent years. Such a color document is output monochromatically in consideration of cost in many cases.

In a case where a color image is output as a monochrome image, a process that converts color data into gray scale data is needed. In a case where each color is represented by an RGB value, such a conversion process usually employs a method that converts an RGB value of each color included in original color data into a gray value using a formula that converts an RGB value into a luminance value (Y). Such a general gray conversion process has a problem that color scheme intention of a color document is not necessarily reflected to a gray scale document appropriately. The color scheme intention described here is to distinguish and to arrange a color used for a body, a color used for an emphasis part, colors used for a headline, a title, and a background, for example.

The following solution is proposed against such a problem.

Specifically, a color scheme setting of an original document is replaced with a corresponding shade color scheme setting for a gray scale in a case where print data of the original document that is described in a structured language is generated as gray scale data. This gives a gray scale image that meets intention of the original color scheme setting (for example, see Japanese Laid-Open Patent Publication (Kokai) No. 2013-125434 (JP 2013-125434A)).

However, the method of the above-mentioned publication is specialized in print data described in a structured language. Accordingly, a gray scale image to which color scheme intention of an original color image is appropriately reflected cannot be generated because grays corresponding to "roles" of colors used for characters and figures in the original color image cannot be applied in a case where print data is described in a general language, such as a page description language.

SUMMARY OF THE INVENTION

The present invention provides an image processing apparatus and a control method therefor, which are capable of converting an original color image into a monochrome image to which color scheme intention of the original color image is reflected appropriately.

Accordingly, a first aspect of the present invention provides an image processing apparatus including an extraction unit configured to extract colors used for characters and figures in color data, a first determination unit configured to determine one of the colors as a base color, a second determination unit configured to determine another of the colors as an accent color, and an application unit configured to convert the color data into monochrome data by applying a predetermined gray to the base color determined and applying a gray that is distinguishable from the predetermined gray and has a density higher than the predetermined gray to the accent color.

Accordingly, a second aspect of the present invention provides an image processing apparatus including an input unit configured to input a color page that includes a plurality of colors, and a conversion unit configured to convert the plurality of colors included in the color page into densities of grays. The densities of grays are determined based on frequencies of the plurality of colors included in the color page.

Accordingly, a third aspect of the present invention provides an image processing apparatus including an input unit configured to input a color page that includes a plurality of colors, and a conversion unit configured to convert the plurality of colors included in the color page into gray densities. The densities of grays are determined based on saturations calculated from the plurality of colors included in the color page.

Accordingly, a fourth aspect of the present invention provides a control method for an image processing apparatus, the control method including an input step of inputting a color page that includes a plurality of colors; and a converting step of converting the plurality of colors included in the color page into gray densities. The densities of grays are determined based on frequencies of the plurality of colors included in the color page.

Accordingly, a fifth aspect of the present invention provides a control method for an image processing apparatus, the control method including an input step of inputting a color page that includes a plurality of colors, and a converting step of converting the plurality of colors included in the color page into gray densities. The densities of grays are determined based on saturations calculated from the plurality of colors included in the color page.

According to the present invention, the original color image is able to be converted into the monochrome image to which the color scheme intention of the original color image is reflected appropriately.

Further features of the present invention will become apparent from the following description of exemplary embodiments with reference to the attached drawings.

BRIEF DESCRIPTION OF THE DRAWINGS

FIG. 11A and FIG. 11B are flowcharts showing procedures of the entire process according to the first and second embodiments.

FIG. 12A, FIG. 12B, and FIG. 12C are views describing color-scheme-policy information and color-scheme-policy reproduction information shown in FIG. 2.

DESCRIPTION OF THE EMBODIMENTS

Hereafter, embodiments according to the present invention will be described in detail with reference to the drawings.

Figure 1:
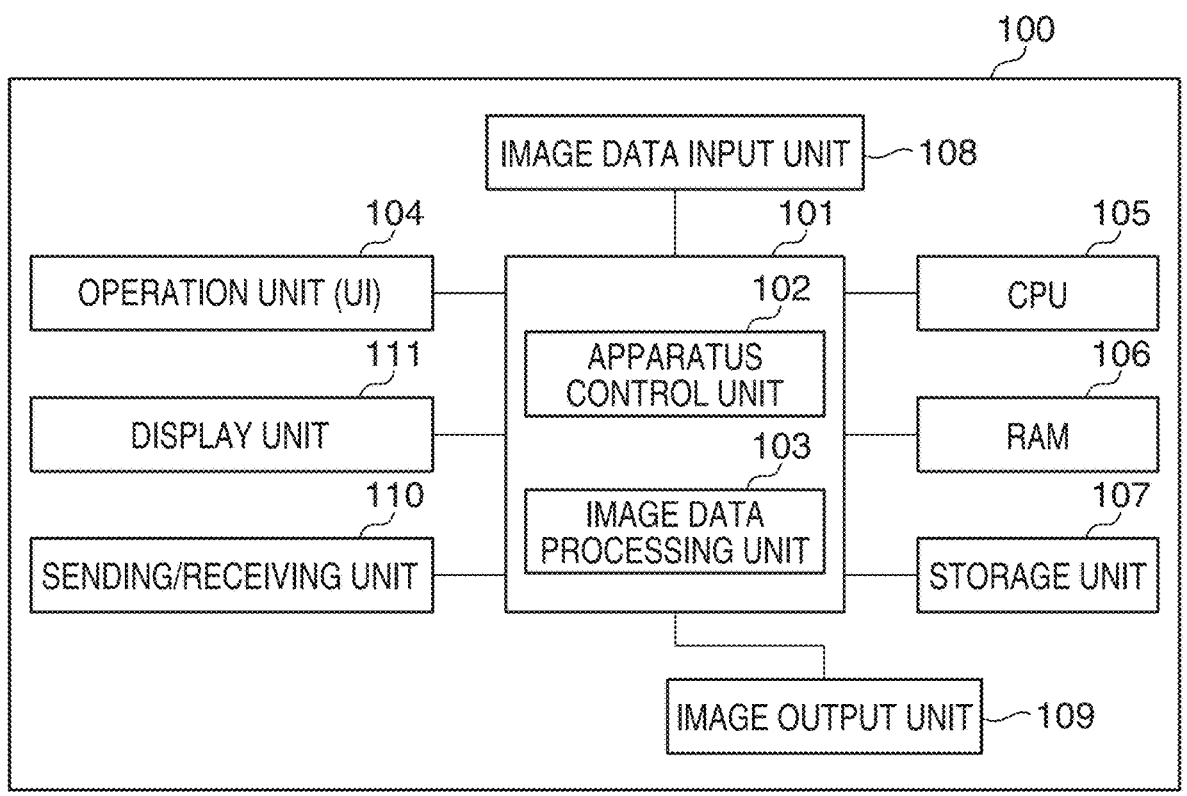
FIG. 1 is a block diagram schematically showing a common hardware configuration among image forming apparatuses according to first through fifth embodiments of the present invention.

FIG. 1 is a block diagram schematically showing a common hardware configuration of image processing apparatuses according to first through fifth embodiments of the present invention.

The image processing apparatus 100 is provided with a control unit 101, an operation unit (UI) 104, a CPU 105, a RAM 106, a storage unit 107, an image data input unit 108, an image output unit 109, a sending/receiving unit 110, and a display unit 111. The control unit 101 has an apparatus control unit 102 that controls the image processing apparatus 100 and an image data processing unit 103 that optimizes image data.

The control unit 101 performs various processes to image data using the CPU 105 and RAM 106. Specifically, the control unit 101 obtains image data from the image data input unit 108, processes the image data, stores the image data into the storage unit 107, and prints an image or displays the image on a monitor through the image output unit 109. Although the image data input unit 108 consists of a scanner, the storage unit 107 consists of an HDD, and the image output unit 109 consists of a printer and monitor (not shown) in FIG. 1, the present invention is not limited to the configuration. For example, the image data input unit 108 or the image output unit 109 may be a communication I/F that connects to an external apparatus through a network and inputs/outputs data.

Various settings are notified to the control unit 101 from the operation unit 104 consisting of a mouse and keyboard, and from the display unit 111, such as a touch panel equipped with a preview function. The image data processing unit 103 processes the image data according to the notified settings.

The values set up by the operation unit 104 is saved to the storage unit 107 through the apparatus control unit 102. The image data processing unit 103 reads the saved set values and processes the image data.

The storage unit 107 stores parameters for controlling the image processing apparatus 100, application programs for achieving operations in the first through fifth embodiments mentioned later, and an OS.

Processes of flowcharts described in the first through fifth embodiments are performed when the CPU 105 runs control programs that are developed to the RAM 106.

The image processing apparatus 100 may employ network interfaces, such as a router and a firewall, and an information processing apparatus like a PC, if needed, in addition to the above-mentioned configuration.

Figure 2:
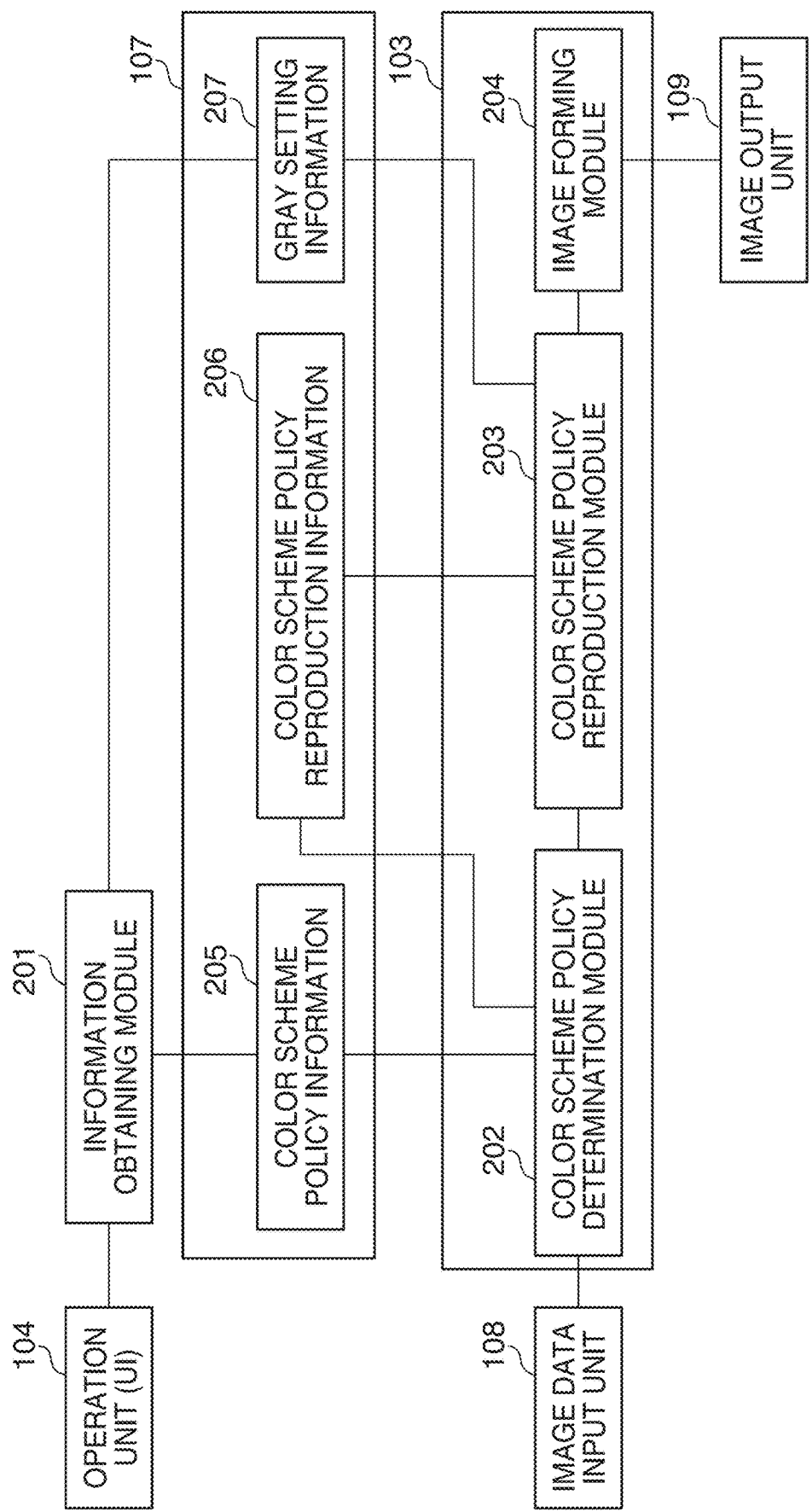
FIG. 2 is a block diagram schematically showing modules required to achieve a color conversion process in the image processing apparatus shown in FIG. 1.

FIG. 2 is a block diagram showing modules required to perform a color conversion process in the image processing apparatus 100 in FIG. 1.

An information obtaining module 201 obtains a set value that a user inputs through the operation unit 104 and reflects the set value to color-scheme-policy information 205, color-scheme-policy reproduction information 206, and gray setting information 207 that are held in the storage unit 107. When the image data input unit 108 receives image data in this state, a color-scheme-policy determination module 202 in the image data processing unit 103 determines a color scheme policy of an image according to an input color signal of the image using the color-scheme-policy information 205. The determination result is stored in the color-scheme-policy reproduction information 206.

A color-scheme-policy reproduction module 203 of the image data processing unit 103 performs color conversion that achieves color-scheme-policy reproduction using a gray value held by the color-scheme-policy reproduction information 206. An image forming module 204 forms an output image using the converted output color signal and the output image is output from the image output unit 109.

Next, the first embodiment of the present invention will be described. First, the image processing method according to the first embodiment that converts a color document into a gray scale document to which color scheme intention of the color document is reflected appropriately will be described with reference to FIG. 7A, FIG. 7B, and FIG. 7C.

Figure 7A:
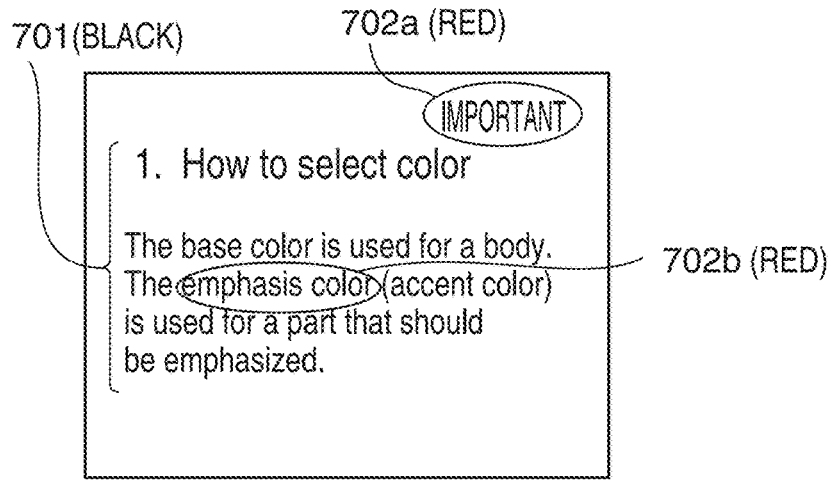
FIG. 7A through FIG. 7F are views describing an image processing method of the present invention that converts a color document into a gray-scale document to which color scheme intention of the color document is reflected appropriately.
Figure 7B:
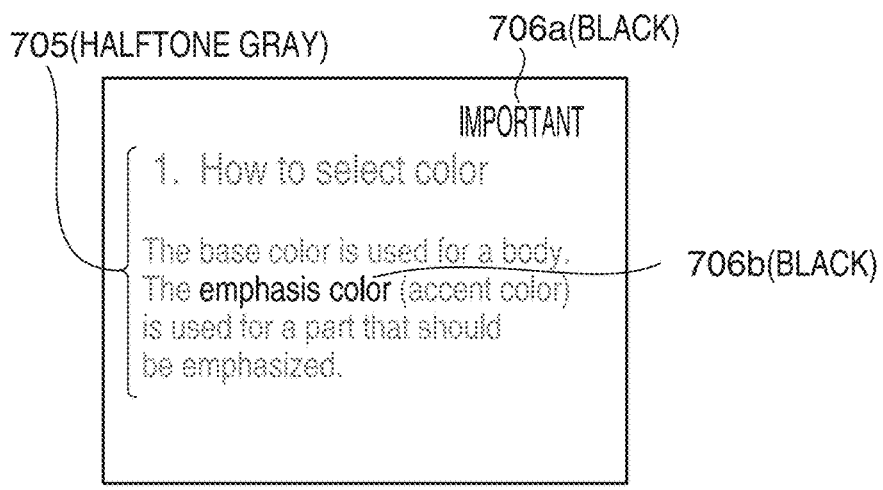
Figure 7C:
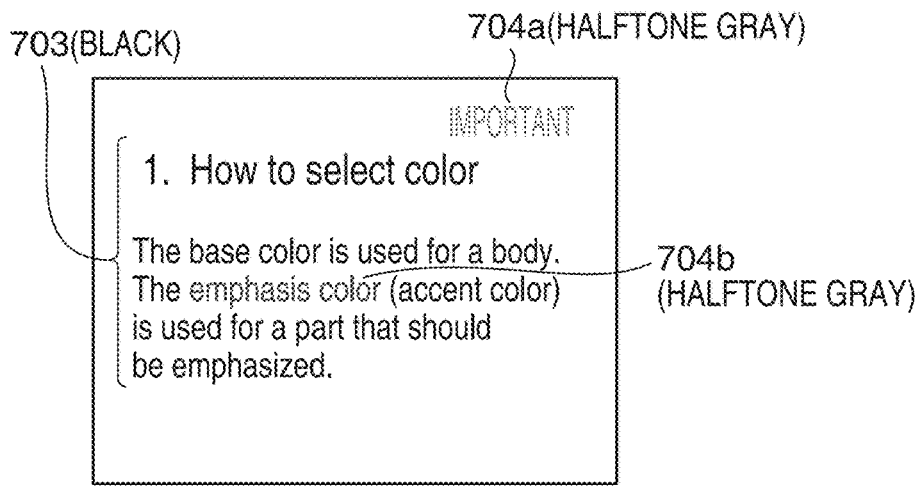

FIG. 7A shows an original color document. A body 701 in the document is black except red characters 702b. A mark 702a is red. FIG. 7C shows a monochrome document that is obtained by converting the color document in FIG. 7A according to the general gray conversion. An original black part of a body 703 keeps black as it is. A mark 704a and characters 704b, which are originally red, are converted into a halftone gray corresponding to an RGB value of the original color. Incidentally, red characters used as a part in a black body of a document include intention to emphasize in many cases. That is, in such cases, "black" is a base color with a "base" role, and "red" is an accent color with an "emphasis" role. However, the characters converted into the halftone gray of which visibility is inferior to the black characters cannot play the "emphasis" role in the monochrome document. FIG. 7B shows a monochrome document that is obtained by converting the color document in FIG. 7A according to the gray conversion of the first embodiment. As shown in FIG. 7B, a density of a mark 706a and characters 706b, which are originally red as the accent color, is clearly, distinguishably higher than a density of a part of a body 705, which is originally black as the base color. This enables the accent color to play the "emphasis" role. Specifically, the mark 706a and the characters 706b are black, and the part of the body 705 is halftone gray in FIG. 7B.

Moreover, the accent color is not necessarily red. In a case where the same parts are blue, the accent color becomes a blue. In such a case, it is preferable to calculate a suitable gray value corresponding to the accent color without calculating a gray value corresponding to a color value of an original color, such as a red or a blue.

As mentioned above, the embodiments of the present invention do not use a gray value that is uniquely determined by applying a certain conversion process to an original color value, but determine a gray value according to a role of the original color.

Hereinafter, a gray conversion process according to the first embodiment will be described with reference to FIG. 11A, FIG. 12A through FIG. 14. In the first embodiment, colors in a document are divided into the base color used for regular characters in a body and the accent color used for a part to emphasize as mentioned above with reference to FIG. 7A through FIG. 7C.

FIG. 11A is a flowchart showing the entire process according to the first embodiment.

The color-scheme-policy determination module 202 of the image data processing unit 103 analyzes image data input through the image data input unit 108 to the image processing apparatus 100 to extract colors of characters and figures in the data in step S1101.

A method for extracting a color designation command accompanying a drawing command of a character or a figure in input image data that is described in the page description language will be described as an example of a color extraction method with reference to FIG. 13.

Figure 13:
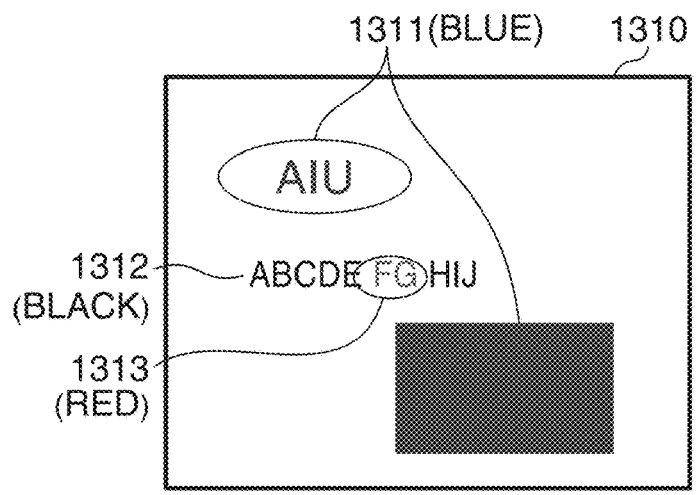
FIG. 13 is a view describing how to extract a color designation command included in input image data in the process in step S1101 in FIG. 11A.

FIG. 13 shows a color document 1310 and commands 1300 of image data corresponding to the document. A "Set Color" command in the data designates a color value used for the following commands, such as a rectangle drawing command "Draw Box" and a character drawing command "Draw Text", as an argument. In this data, a "blue (R=0, G=0, B=255)" set up on a second line is applied to a "rectangle" on a third line. Next, a character size is set up as "18" point on the fourth line, and the "blue (R=0, G=0, B=255)" that is set up on a fifth line is applied to character drawing commands on sixth through eighth lines. Next, the character size is set up as "12" point on the ninth line, and a "black (R=0, G=0, B=0)" that is set up on a tenth line is applied to character drawing commands on eleventh through fifteenth lines. Next, a "red (R=255, G=0, B=0)" set up on sixteenth line is applied to character drawing commands on the following seventeenth and eighteenth lines. The black that is set up on a nineteenth line again is applied to character drawing commands on twentieth through twenty-second lines.

The analysis about the commands in the image data shows that the color values "blue, black, and red" are used in the document (the number of used colors is three). Such a method enables acquisition of the color values and the number of colors used for characters and figures in target data.

Next, an appearance frequency of each of the colors extracted in the step S1101 from the data is calculated in step S1102 in FIG. 11A. In the step S1102, the number of the drawing commands described following certain color designation commands is counted using the number of used colors and color values thereof that have become clear with the color-designation-command extraction method mentioned above. For example, there are four commands applying the blue in total that include one "Draw Box" command and three "Draw Text" commands. Moreover, there are two commands applying the red in total that include two "Draw Text" commands. On the other hand, there are eight commands applying the black in total that include eight "Draw Text" commands. This proves that the black has the highest appearance frequency and the red has the lowest appearance frequency.

A role of each color is determined using the appearance frequency information obtained by the above-mentioned method. That is, the color with the highest appearance frequency is determined as the base color in step S1103 and the color with the lowest appearance frequency is determined as the accent color in step S1104. The results determined in the steps S1103 and S1104 are saved in the color-scheme-policy information 205 in FIG. 12B that is a data table stored in the storage unit 107. Determining target colors, appearance frequencies, saturations, roles, and the number of determining target colors are respectively stored in rows 1200, 1204, 1205, 1206, and 1207 of the target-color-scheme-policy information 205. In the case, the black with the highest appearance frequency and the red with the lowest appearance frequency become determination targets among the colors used. As shown in FIG. 12B, the appearance frequency and the determined role of the black are respectively stored in rows 1204 and 1206 of a line 1201 of the color-scheme-policy information 205. The appearance frequency and the determined role of the red are respectively stored in the rows 1204 and 1206 of a line 1203 similarly. The appearance frequency and the determined role of the blue are respectively stored in the rows 1204 and 1206 of a line 1202.

Next, a pair of gray values that are mutually distinguishable are selected from among a full-gradation gray scale for the base color and accent color in step S1105 in FIG. 11A. After that, the gray of which density is visually emphasized most is applied to the accent color as an "emphasis gray" between the selected gray values, the other gray is applied to the base color as a "base gray", and this process finishes.

The gray values that are selected so as to be mutually distinguishable and are applied to the roles are defined beforehand in the color-scheme-policy reproduction information 206 shown in FIG. 12C that is a data table stored in the storage unit 107 in the first embodiment.

The gray values corresponding to the roles that are beforehand defined in the color-scheme-policy reproduction information 206 will be described with reference to FIG. 14.

Figure 14:
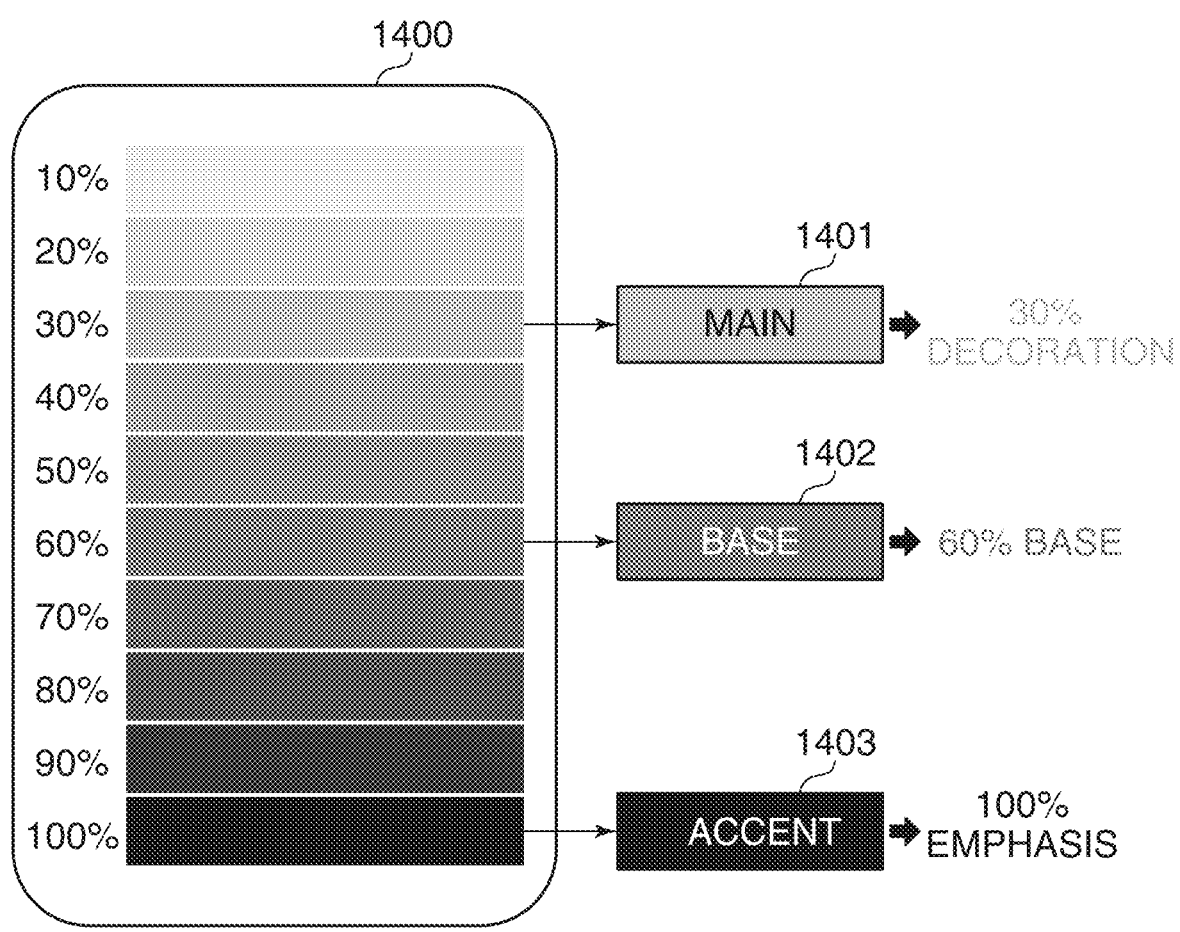
FIG. 14 is a view describing gray values corresponding to roles defined as color-scheme-policy reproduction information.

In a gray scale 1400 in FIG. 14, an output density (a gray value) varies from 10% to 100% at an interval of 10%. A discrimination property of each gray value varies depending on a density level or an output characteristic of the image output unit 109. Accordingly, the gray values that reproduce the roles of the colors are determined beforehand according to the output characteristic of the image output section 109, and are stored as the gray value information in a row 1217 of the color-scheme-policy reproduction information 206 shown in FIG. 12C. Specifically, the highest density 1403 that plays the role of emphasis from the gray scale is allocated to the gray value of the accent color, and the medium density 1402 that is distinguishable from the density of the accent color and is suitable for reproducing characters is allocated to the gray value of the base color. The allocations are determined on the basis of the color scheme policy of how to reproduce the roles of the colors in the gray suitably. Thus, the definition of the color-scheme-policy reproduction information 206 enables the allocations of the gray values to the accent color and base color corresponding to the roles thereof.

The colors and the roles determined in the steps S1103 and S1104 in FIG. 11A are respectively stored as target colors and roles in rows 1210 and 1214 of the color-scheme-policy reproduction information 206 in FIG. 12C. Determination of a role enables reference to the suitable gray value in a row 1217 according to the policy defined in rows 1215 and 1216 using the color-scheme-policy reproduction information 206. For example, since the target color "black" is determined as the color of the role of "base" in the step S1103 in FIG. 11A, the gray of 60% is applied in the step S1105 as an applied gray corresponding to the base color with reference to the row 1217. Similarly, since the target color "red" is determined as the color of the role of "accent" in the step S1104 in FIG. 11A, the gray of 100% is applied in the step S1105 as the applied gray corresponding to the accent color with reference to the row 1217.

The above-mentioned process enables the gray conversion using the grays suitable for the roles of the base color and accent color respectively applied to black and red. In addition, although a color other than the colors determined to have the roles of the base color and accent color is processed by a regular gray conversion in the first embodiment, the present invention is not necessarily limited to the process. For example, a density of a gray corresponding to a color may be determined on the basis of an appearance frequency of each color (color of a pixel) included in input image data calculated in the step S1102.

Next, the second embodiment of the present invention will be described. In the second embodiment, roles of characters and figures used in a color image are determined using saturation information about original colors as follows.

The color used as the accent color is expected to have high saturation. On the contrary, a low-saturation color or an achromatic color is expected to be used as the base color in many cases. In the second embodiment, a role is determined using the saturation information about the original color expected in this way. Hereinafter, a concrete process will be described with reference to a flowchart in FIG. 11B.

In addition, the same step numbers in FIG. 11A are attached to the steps performing the same processes in the flowchart in FIG. 11B.

After extracting characters and figures in the step S1101, the saturation information about each color (target color) extracted is calculated in step S1106. This calculation uses the following relational expression in a case where the colors extracted in the step S1101 are specified by respective RGB values.

$$C=(Vt-V\min)/V\max$$

Where

C: Saturation,

Vt: RGB value of target color,

Vmin: Minimum value among RGB values of all colors extracted, and

Vmax: Maximum value among RGB values of all colors extracted.

The color with the highest saturation is set as the accent color in step S1107, and the color with the lowest saturation is set as the base color in step S1108. After that, grays corresponding to roles are set up through the process as with the first embodiment in the step S1105. In addition, colors other than the base color and accent color that are determined to have the roles are processed using the regular gray conversion as with the first embodiment.

According to the above-mentioned process, the colors that have the roles of the base and accent are specified, and the grays suitable for the roles are applied to the characters and figures used in the image.

Next, the third embodiment of the present invention will be described. The first and second embodiments described the color scheme policy in the gray conversion in the case where two kinds of roles including the base and accent were defined. However, the presentation documents mentioned above use the same color, which is different from the colors used for the base and accent, for a frame, a title background, and headline characters in order to unify a visual aspect of the entire document in many cases.

Such a color with a decoration role of a document is defined as a main color in the third embodiment. Hereinafter, a color scheme policy that defines the base role, accent role, and main role will be described with reference to FIG. 7D, FIG. 7E, and FIG. 7F.

Figure 7D:
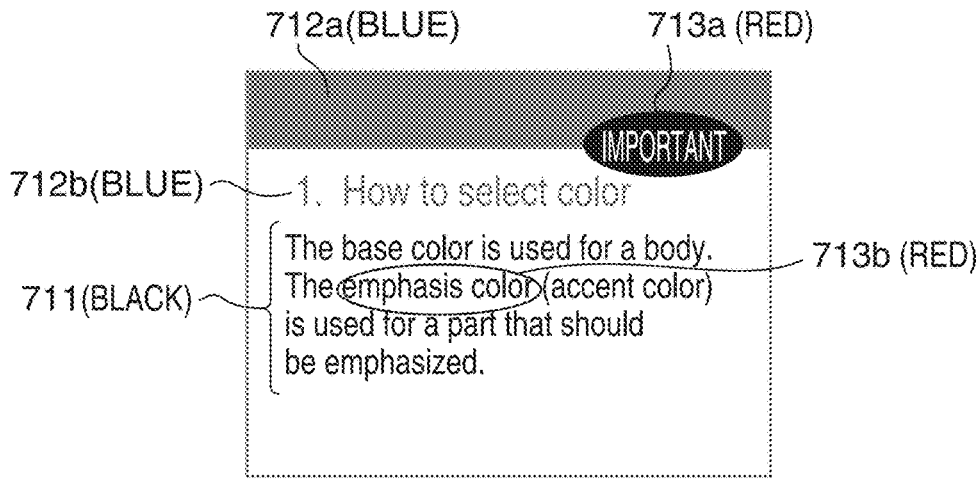

FIG. 7D shows an original color document. In the document, a body 711 is black, headline characters 712b and a background frame 712a are blue, and characters 713b of a part of the body and a mark 713a are red. FIG. 7F shows a monochrome document that is obtained by converting the color document in FIG. 7A according to the general gray conversion shown by the following formula that converts an sRGB value into a luminance gray value.

$$\text{Gray}=0.299*R+0.587*G+0.114*B$$

That is, an original black part of a body 714 keeps black as it is. Headline characters 715b and a background frame 715a, which are originally blue, and characters 716b and a mark 716a, which are originally red, are respectively converted into halftone grays corresponding to RGB values of the original colors.

As a result of the gray conversion, luminance gray values of the red (R=255, G=0, B=0) and the blue (R=0, G=0, B=255) become "76" and "29", respectively. The luminance of the originally blue headline characters 715b and background frame 715a becomes lower than the luminance of the originally red characters 716b and mark 716a. Accordingly, the originally blue headline characters 715b and background frame 715a are reproduced in a gray of which a density is thicker than the originally red characters 716b and mark 716a at the time of output.

Namely, when the general gray conversion is used, the originally blue headline characters 715b and background frame 715a with the higher appearance frequency are reproduced in a gray of which a density is thicker than the originally red characters 716b and mark 716a that should be emphasized. Accordingly, the originally red characters 716b and mark 716a are no longer emphasized within the monochrome document after the gray conversion. Moreover, since there is not enough difference in the density between the gray applied to the originally blue headline characters 715b and background frame 715a and the gray applied to the body 714 in the base color, it is difficult to discriminate the headline characters from the body by color after the gray conversion. The main color is applied to a frame, title background, and big headline in many cases in order to unify a visual aspect of a document as mentioned above. Since the main color has a decoration role, a color with high saturation is not usually selected in order to avoid a complicated impression of the entire document. It is preferable to apply a gray thinner than the base and accent colors to the main color having such a role.

Figure 7E:
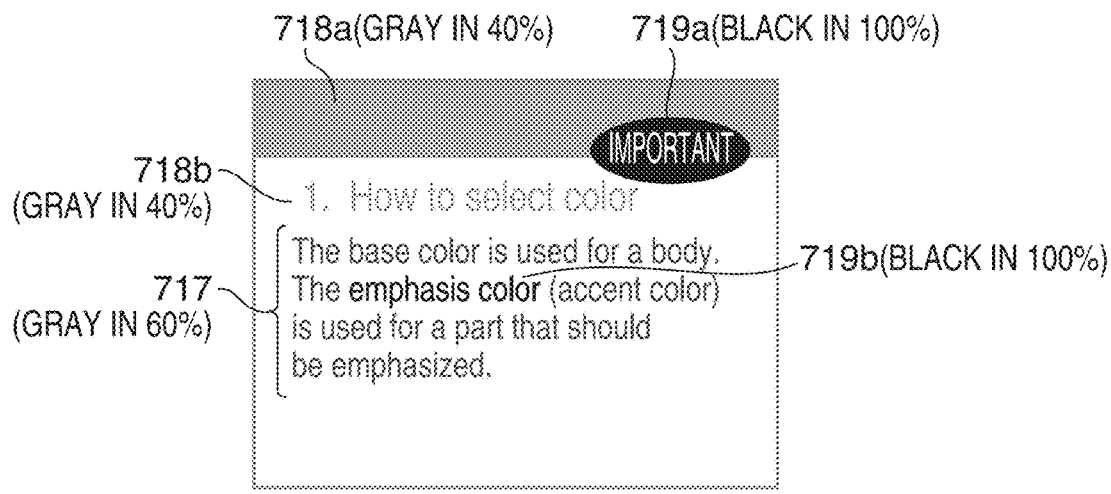
Figure 7F:
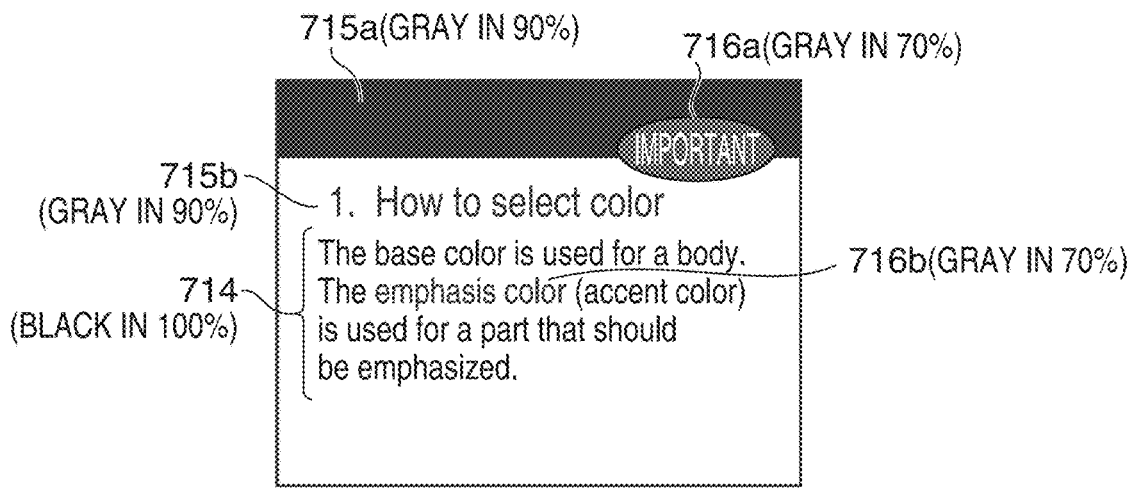

Based on this, as shown in FIG. 7E, the gray corresponding to the blue that is the main color is thinner than the grays corresponding to the black that is the base color and the red that is the accent color. Thereby, the main color plays the decorative role that keeps harmony of the entire document.

Specifically, as shown in FIG. 7E, a mark 719*a* and characters 719*b* are black, an upside background frame 718*a* and headline characters 718*b* are gray in 40%, and a body 717 is gray in 60%.

Next, the third embodiment of the present invention will be described. In the first and second embodiments, the color scheme policy was determined according to the feature (appearance frequency, saturation) of the color without considering the number of colors included in the document. In the third embodiment, the above-mentioned color scheme policy corresponding to the roles is applied only in a case where a few colors are used in a document. On the other hand, if many colors are used in a document, the color scheme policy is not applied because it is determined that the document does not give specific roles to colors and that the colors are used for a purpose of decoration.

That is, in the third embodiment, the color scheme policy corresponding to the roles is applied only in a case where the number of roles (three types including the base, accent, and main) is equal to the number of colors used in an original color document.

Figure 3:
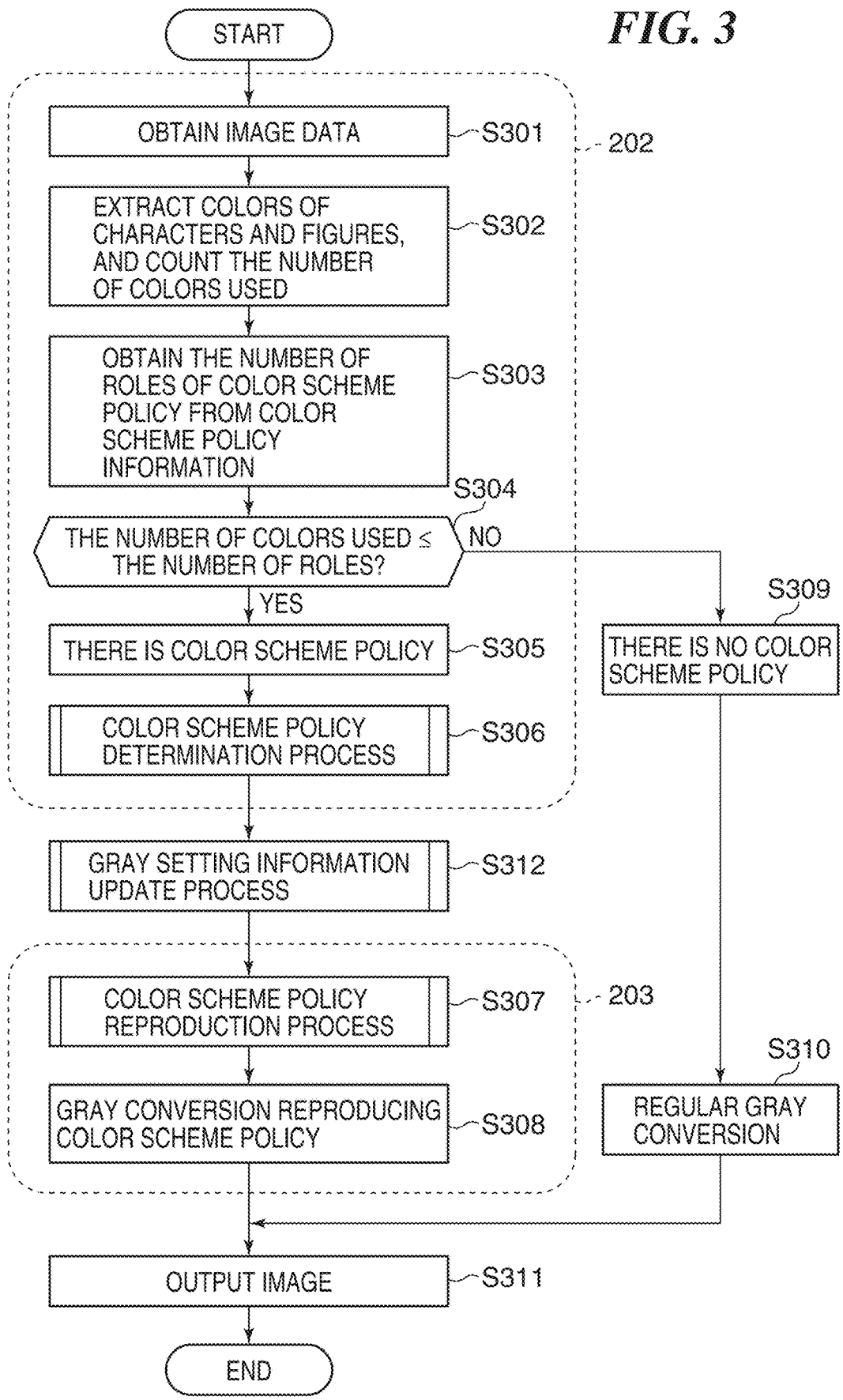
FIG. 3 is a flowchart showing procedures of the entire process according to the third and fourth embodiments.

Hereinafter, the process of the third embodiment will be described with reference to FIG. 3 through FIG. 6, and FIG. 10. FIG. 3 is a flowchart showing the entire process according to the third embodiment.

First image data input from the image data input unit 108 is obtained in step S301.

In the next step S302, colors used for characters and figures are extracted by the same method as the step S1101 in FIG. 11A mentioned above, and then, the number of extracted colors is counted.

In step S303, the number of roles of the color scheme policy is obtained from the color-scheme-policy information 205 held in the storage unit 107. In the third embodiment, the number of roles is "3" that is stored in a row 1207 showing the number of determining target colors in FIG. 12B. In the next step S304, the number of colors (hereinafter referred to as "the number of used colors") counted in the step S302 is compared with the number of roles obtained in the step S303. When the number of used colors is more than the number of roles (NO in the step S304), the process proceeds to step S309 because the document is determined not to have a color scheme policy. Then, the regular gray conversion is performed in step S310, the image after the gray conversion is output in step S311, and this process finishes.

On the other hand, when the number of used colors is equal to or less than the number of roles (YES in the step S304), the process proceeds to step S305 because the document is determined to have a color scheme policy, and a color-scheme-policy determination process is performed in step S306.

Figure 4:
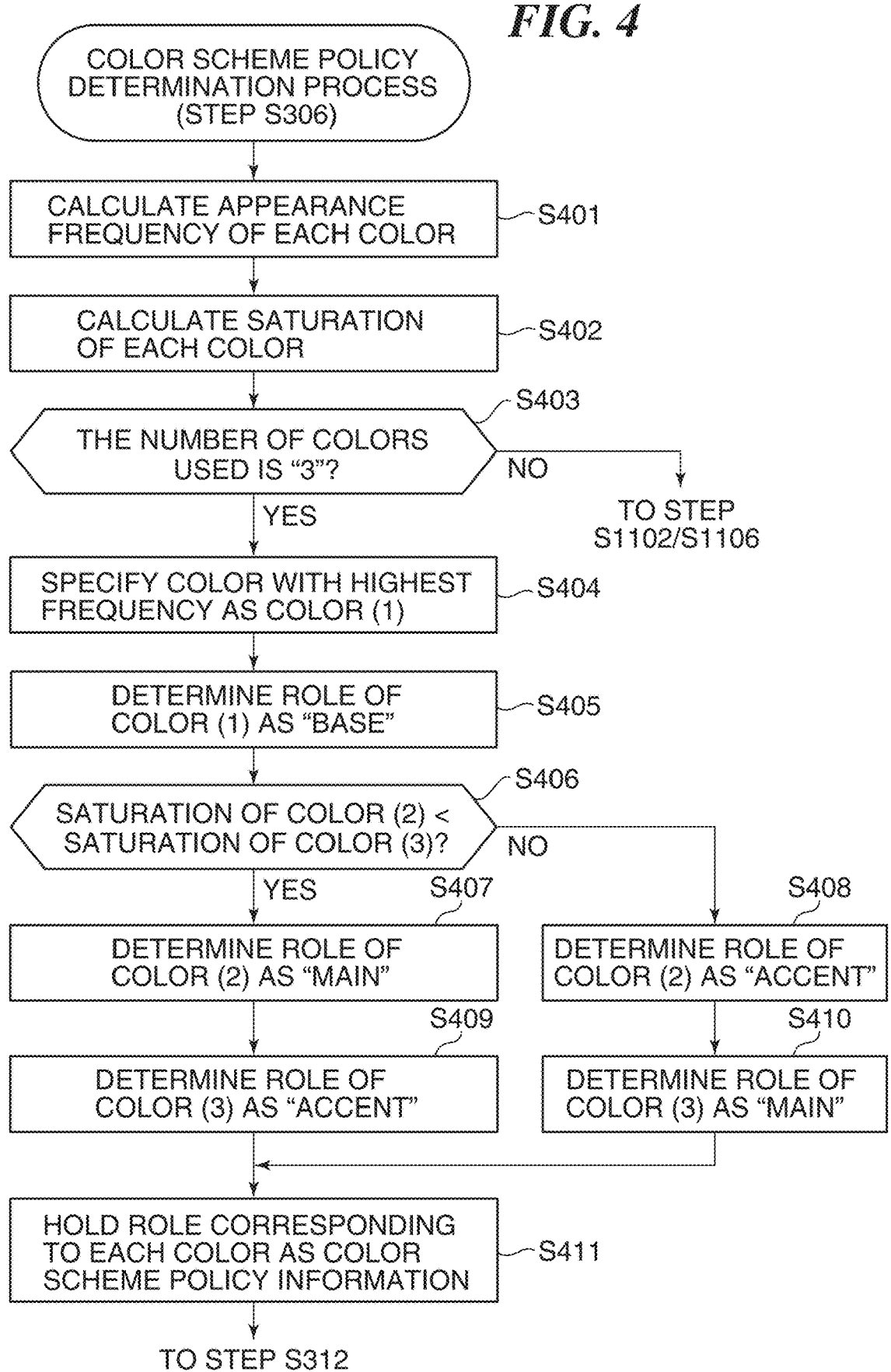
FIG. 4 is a flowchart showing procedures of a color-scheme-policy determination process in step S306 in FIG. 3 according to the third embodiment.

FIG. 4 is a flowchart showing procedures of the color-scheme-policy determination process in step S306 in FIG. 3 according to the third embodiment.

The third embodiment describes a case where the number of used colors is "3". Moreover, since the number of roles allocated to the colors is also "3", the roles are determined on the basis of both the appearance frequency and saturation.

Moreover, the third embodiment performs a primary determination using a feature of "the base color appears at a high frequency" as a determination condition in a case where each color is arranged in a coordinate space in which a vertical axis denotes the appearance frequency and a horizontal axis denotes the saturation as shown in FIG. 12A. The color with the highest appearance frequency is selected by the primary determination, and a secondary determination for the two remaining colors is performed on the basis of the saturation.

The appearance frequency and saturation of each color are respectively calculated in steps S401 and S402. The appearance frequency and saturation of each color are calculated by the methods similar to the methods in the step S1102 in FIG. 11A and the step S1106 in FIG. 11B, respectively, described in the first embodiment.

In the next step S403, it is determined whether the number of used colors counted in the step S302 is "3". When the number of used colors is not "3" (NO in the step S403), i.e., when the number is "2", for example, the process in and after the step S1102 in FIG. 11A or the process in and after the step S1106 in FIG. 11B is performed in order to allocate the roles of used colors to the base and accent.

On the other hand, when the number of used colors is "3" (YES in the step S403), the process proceeds to the step S404 in order to allocate the roles of the used colors to the base, accent, and main, respectively.

The color (1) with the highest appearance frequency among the three used colors is specified in the step S404, and the color (1) is determined as the base color in step S405.

The saturations of the remaining two colors (2) and (3) are compared in step S406. When it is determined that the saturation of the color (2) is lower than the saturation of the color (3) (YES in the step S406), the color (2) with the lower saturation is determined as the main color in step S407, the color (3) with the higher saturation is determined as the accent color in step S409, and the process proceeds to step S411. On the other hand, when it is determined that the saturation of the color (2) is equal to or more than the saturation of the color (3) (NO in the step S406), the color (2) with the higher saturation is determined as the accent color in step S408, the color (3) with the lower saturation is determined as the main color in step S410, and the process proceeds to step S411.

The color-scheme-policy information 205 is updated in the step S411 by storing the determined appearance frequency, saturation, and role of each used color to the rows 1204, 1205, and 1206, respectively, of the line corresponding to each color of the color-scheme-policy information 205 shown in FIG. 12B. Values in lines 1211, 1212, and 1213 of the color-scheme-policy reproduction information 206 shown in FIG. 12C are fixed on the basis of the updated color-scheme-policy information 205, and then, the process in FIG. 4 finishes and the process proceeds to the step S312.

In the next step S312, an update process of the gray setting information 207 used by the color-scheme-policy reproducing process in step S307 mentioned later is performed. The update process of the gray setting information 207 is performed in a case where a user changes a gray set value through the operation unit 104, and the details will be described in the fifth embodiment mentioned later with reference to FIG. 9A through FIG. 9F and FIG. 10.

Figure 10:
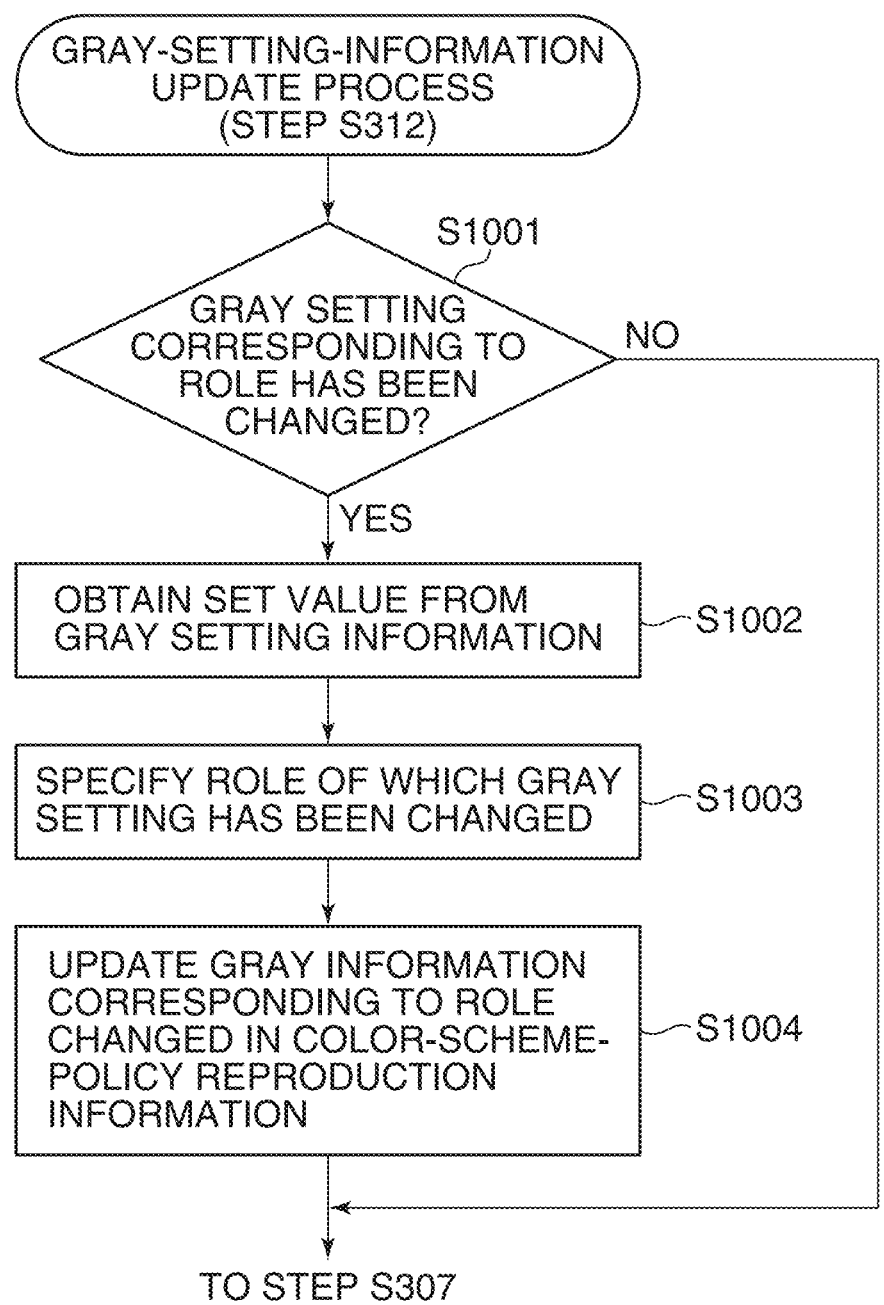
FIG. 10 is a flowchart showing an applied-gray setting process according to the fifth embodiment.

In the third embodiment, it is determined that the setting is not changed in step S1001 in FIG. 10, the process proceeds to the following step S307 as-is, and the color-scheme-policy reproducing process starts in the step S307.

Figure 6:
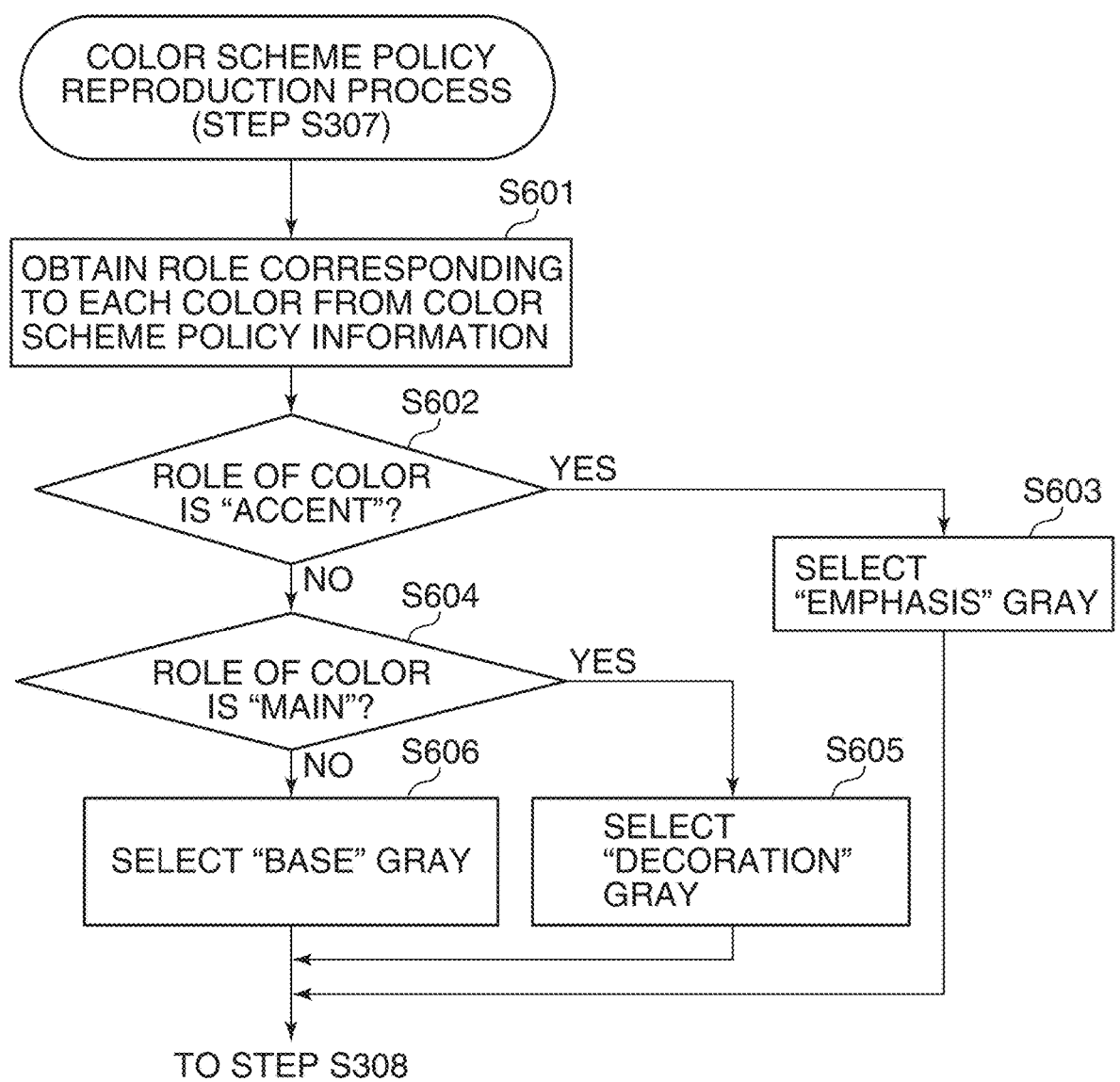
FIG. 6 is a flowchart showing procedures of a color-scheme-policy reproducing process in step S307 in FIG. 3.

FIG. 6 is a flowchart showing procedures of the color-scheme-policy reproducing process in the step S307 in FIG. 3.

The role corresponding to each color is obtained from the color-scheme-policy reproduction information 206 in step S601.

In step S602, it is determined whether the role of the color obtained in the step S601 is the accent. When the role is the accent, the process proceeds to step S603. In the step S603, the value of "100%" in the row 1217 of the line 1213 of the color-scheme-policy reproduction information 206 is selected as the gray applied to the reproduction role of "emphasis". Then, the process in FIG. 6 finishes and the process proceeds to the step S308.

On the other hand, as a result of the determination in the step S602, when the role is not the accent, the process proceeds to step S604 and it is determined whether the role of the color is the main. As a result of the determination, when the role of the color is the main, the process proceeds to step S605, and the value of "40%" in the row 1217 of the line 1212 of the color-scheme-plan reproduction information 206 is selected as the gray applied to the reproduction role of "decoration". Then, the process in FIG. 6 finishes and the process proceeds to the step S308.

On the other hand, as a result of the determination in the step S604, when the role of the color is not the "main", the process proceeds to step S606, and the value of "60%" in the row 1217 of the line 1211 of the color-scheme-plan reproduction information 206 is selected as the gray applied to the reproduction role of the "base". Then, the process in FIG. 6 finishes and the process proceeds to the step S308.

In the step S308, the colors are converted into the gray values that were set up by the process in the step S307, the monochrome image after the conversion is output in the step S311, and the process finishes.

According to the above-mentioned process, the role of the main in addition to the roles of the base and accent are allocated to the colors of the characters and figures used in the image, and the grays suitable for the roles are applied.

Moreover, this process is applied in a case where a few colors are used in the image data, and the regular gray conversion process is applied in a case where many colors are used. Accordingly, the tone is maintained for a general multiple color document as conventionally. As a result, this process is applied to only image data with a clear color scheme policy, which gives the effect of the present invention in that an original color image is able to be converted into a monochrome image to which color scheme intention of the original color image is reflected appropriately.

Next, the fourth embodiment of the present invention will be described. The fourth embodiment performs a primary determination using a feature of "the accent color appears at a low frequency" as a determination condition in the case where each color is arranged in the coordinate space in which the vertical axis denotes the appearance frequency and the horizontal axis denotes the saturation as shown in FIG. 12A. The color with the lowest appearance frequency is selected by the primary determination, and the secondary determination for the two remaining colors is performed on the basis of the saturation.

The fourth embodiment performs processes that are identical to the process in FIG. 3 and the process in the steps S401, S402, and S403 in FIG. 4. Accordingly, the description that overlaps with the third embodiment is omitted hereinafter.

Figure 5:
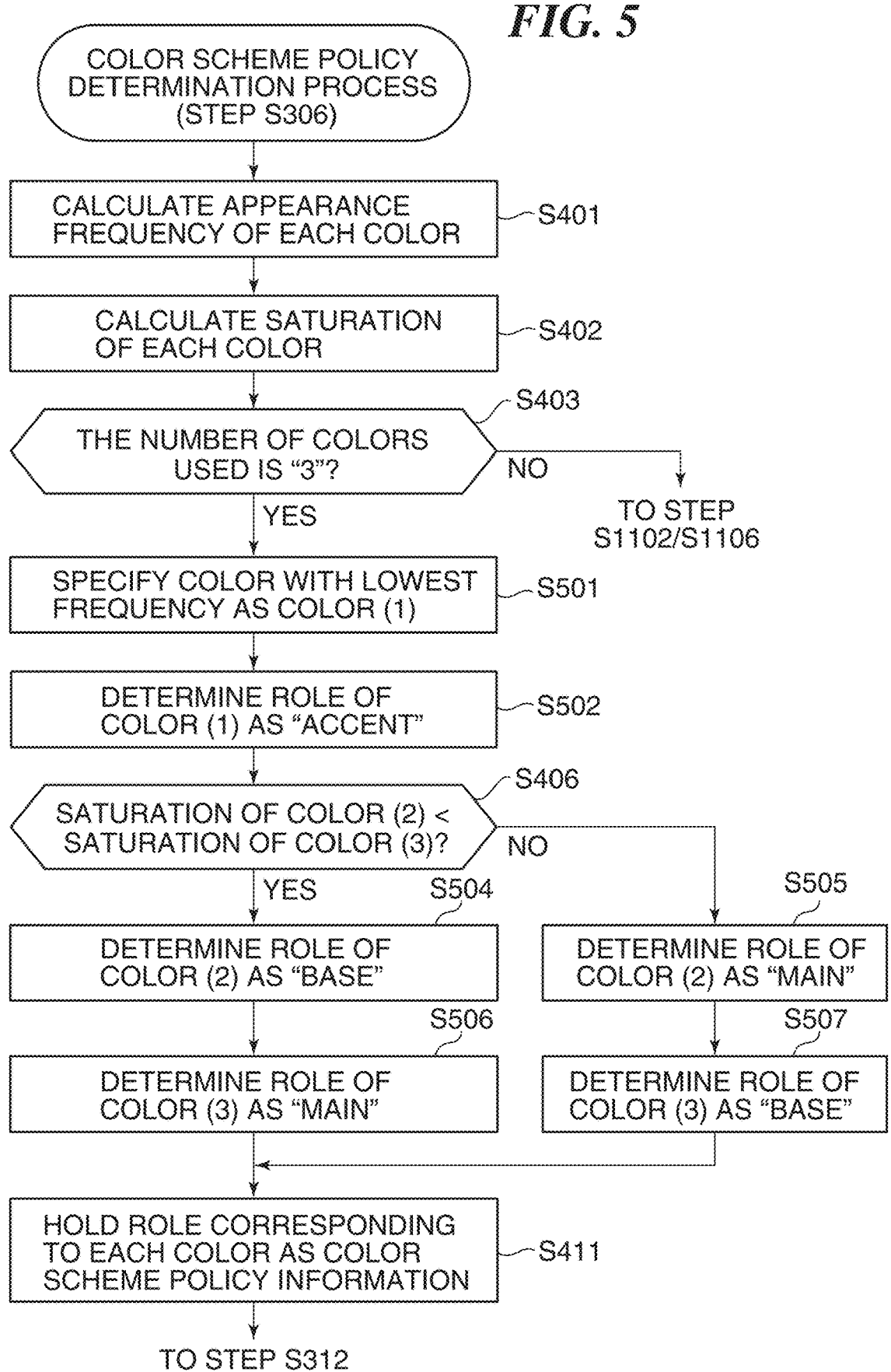
FIG. 5 is a flowchart showing procedures of a color-scheme-policy determination process in the step S306 in FIG. 3 according to the fourth embodiment.

FIG. 5 is a flowchart showing procedures of the color-scheme-policy determination process in the step S306 in FIG. 3 according to the fourth embodiment.

First, the process in the steps S401, S402, and S403 in FIG. 4 are performed. In a case where it is determined that the number of used colors is "3" in the step S403, the process proceeds to the step S501.

The color (1) with the lowest appearance frequency among the three used colors is specified in the step S501, and the color (1) is determined as the accent color in step S502.

The saturations of the remaining two colors (2) and (3) are compared in step S503. When it is determined that the saturation of the color (2) is lower than the saturation of the color (3) (YES in the step S503), the color (2) with the lower saturation is determined as the base color in step S504, the color (3) with the higher saturation is determined as the main color in step S506, and the process proceeds to the step S411. On the other hand, when it is determined that the saturation of the color (2) is equal to or more than the saturation of the color (3) (NO in the step S503), the color (2) with the higher saturation is determined as the main color in step S505, the color (3) with the lower saturation is determined as the base color in step S507, and the process proceeds to the step S411.

The determined appearance frequency, saturation, and role of each color are stored into the rows 1204, 1205, and 1206, respectively, of the line corresponding to each color of the color-scheme-policy information 205 shown in FIG. 12B in the step S411. At this time, values of the lines 1211, 1212, and 1213 of the color-scheme-policy reproduction information 206 shown in FIG. 12C are fixed on the basis of the updated color-scheme-policy information 205, and then, the process in FIG. 5 finishes and the process proceeds to the step S312. The following process is the same as that of the third embodiment.

Next, the fifth embodiment of the present invention will be described. The fifth embodiment describes a case where color scheme policy determination and color-scheme-plan reproduction are set up from outside.

In the first and second embodiments, there is no condition about the number of colors of characters and figures in input image data, and the gray conversion using the color scheme policy is performed for two colors that have the most characteristic appearance frequencies or saturations among all the colors. Moreover, in the third and fourth embodiments, the gray conversion using the color scheme policy is performed only in a case where the number of used colors falls within the range of the number of roles defined in the color-scheme-policy information 205 and where the number of used colors is "3".

The fifth embodiment describes how to perform the gray conversion using the color scheme policy even in a case where the number of used colors is more than the number of roles. There is a UI that enables a user to set up the number of colors to which the color scheme policy is applied (hereinafter referred to as "the number of determining target colors"). The gray conversion using the color scheme policy is performed within the range of the set-up number of colors.

Figure 9A:
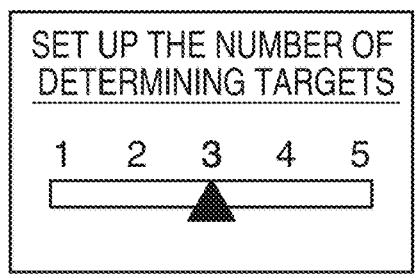
FIG. 9A through FIG. 9F are views describing a target color number setting screen according to the fourth embodiment, an applied-gray change screen and applied-gray value setting screen according to the fifth embodiment.
Figure 9B:
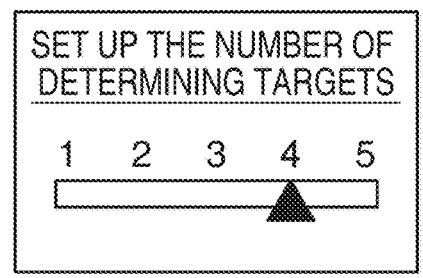

FIG. 9A and FIG. 9B show examples of a setting screen through which the above-mentioned number of determining target colors is set up. The setting screen is displayed on the operation unit 104. FIG. 9A shows an initial setting in which the number of determining target colors is set to "3" that is the same as the number of roles. On the other hand, FIG. 9B shows a state where the user changed the number of determining target colors to "4" from the default setting using the operation unit 104. Such a change updates the number of determining target colors stored in the line 1207 of the color-scheme-policy information 205.

Figure 8:
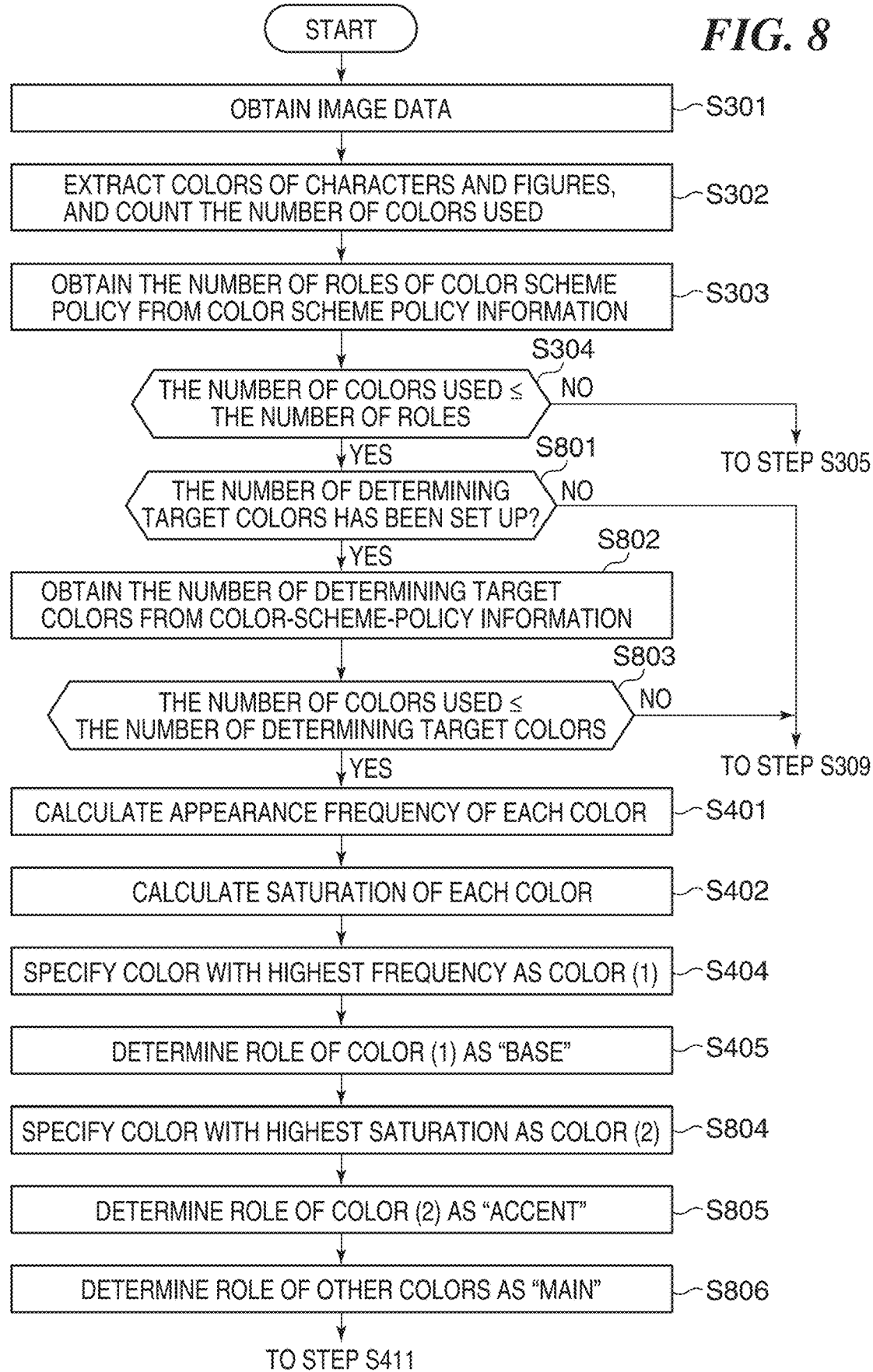
FIG. 8 is a flowchart showing procedures of the entire process according to the fourth embodiment.

Hereinafter, the entire process of the fifth embodiment will be described with reference to FIG. 8. It should be noted that a process that is the same as that in the third and fourth embodiments is denoted by the same step number, and an overlapped description is omitted. First, the process that is the same as the steps S301 through S304 is performed. When the number of used colors is more than the number of roles, the process proceeds to step S801. In the step S801, it is determined whether the number of determining target colors has already been set up. In a case where the number has not been set up yet, the process proceeds to the step S309 in FIG. 3 as-is because it is determined that the process does not apply to the case. In a case where the number has already been set up, the value in the row 1207 showing the number of determining target colors held in the color-scheme-policy information 205 is obtained in step S802. In the next step S803, it is determined whether the number of used colors is equal to or less than the number of determining target colors. In a case where the number of used colors is more than the number of determining target colors, the process proceeds to the step S309 in FIG. 3 because it is determined that the process will not be applied to the case.

In a case where the number of used colors falls within the range of the number of determining target colors, the process in the steps S401, S402, S404, and S405 is performed as with the second embodiment because it is determined that the document has the color scheme policy. After that, the color (2) with the highest saturation is specified in step S804, and the role of the specified color (2) is determined as the accent in step S805. Then, the role of the remaining colors other than the base and accent is determined as the main in step S806. As a result, the gray value of "40%" that is the gray applied to the reproduction role of "decoration" of the color-scheme-policy reproduction information 206 is applied to the remaining colors even if they are different colors. After that, the process proceeds to the step S411.

Thereby, even if the number of used colors is more than the number of roles, colors other than the base color and accent color are collectively treated as the main color. In a particular case where the user has set up the determining target colors, it becomes available for outputting not a monochrome document in which multi-gradation grays corresponding to used colors intermingle but a monochrome document that clearly reproduces the roles of the colors with grays of which the number is equal to or less than the number of roles.

Moreover, the fifth embodiment differs from the third and fourth embodiments also in that the user is allowed to change a setting of a gray value corresponding to each role through the operation unit 104.

Figure 9C:
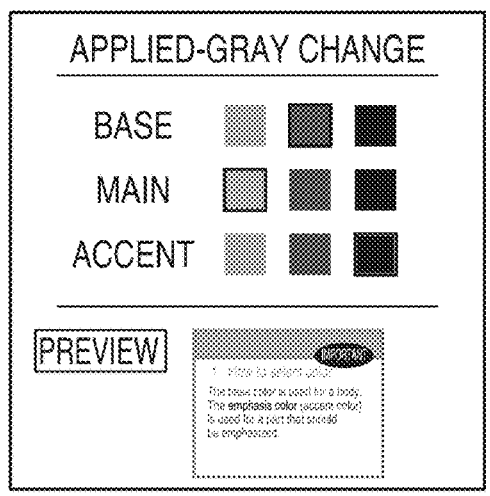
Figure 9D:
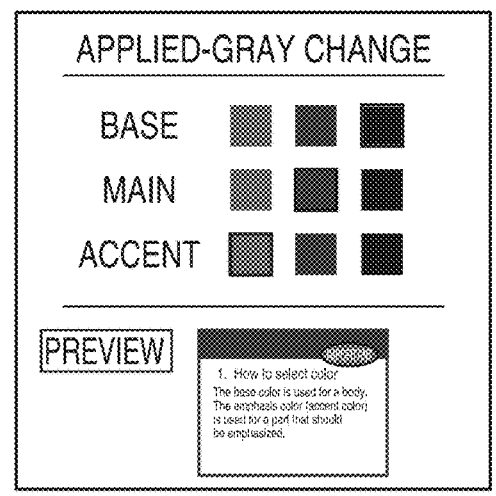

FIG. 9C and FIG. 9D are views showing examples of an "applied-gray change" screen used for switching gray values of three levels corresponding to three roles defined beforehand. FIG. 9C shows a screen corresponding to an initial setting, and default gray values corresponding to the roles are selected. The user can change a gray that is applied to each of the roles among three-level grays on the screen. On the other hand, FIG. 9D shows a case where the user respectively selected the highest-density gray, the medium-density gray, and the lowest-density gray for the base, main, and accent in the "applied-gray change" screen using the operation unit 104. Moreover, a preview screen in a low area shows how image data is converted into a monochrome image according to the current setting.

Figure 9E:
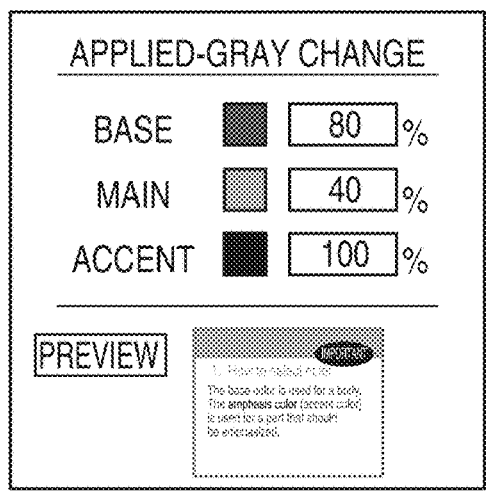
Figure 9F:
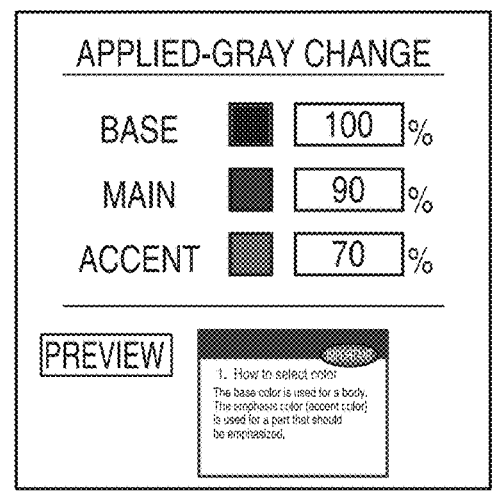

Moreover, an "applied-gray change" screen may be configured as shown in FIG. 9E and FIG. 9F so as to set not a preset gray value but any value for each of the roles. FIG. 9E shows an initial setting screen, and FIG. 9F shows a state where the user changed the gray values for the roles using the operation unit 104.

When the gray values are changed from the initial setting as shown in FIG. 9D or FIG. 9F, the values are stored in the gray setting information 207 stored in the storage unit 107.

When the gray values are changed by the above-mentioned method, a gray-setting-information update process shown in FIG. 10 is performed in the step S312.

It is determined whether a gray setting for each of the roles has been changed in step S1001 in FIG. 10. When any gray settings have not been changed, the color-scheme-policy reproducing process in the step S307 is performed. When a gray setting has been changed, a set value is obtained from the gray setting information 207 in step S1002, and the role of which the gray setting has been changed is specified in step S1003. The gray setting in the color-scheme-policy reproduction information 206 corresponding to the role changed is updated in step S1004. Then, the color-scheme-policy reproducing process is performed in the step S307 using the changed gray value.

As mentioned above, the user is able to set up arbitrarily the gray values applied to the roles, which improve a degree of freedom of the color-scheme-policy reproduction in the monochrome output.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-033523, filed Feb. 24, 2017, which is hereby incorporated by reference herein in its entirety.

What is claimed is:

1. An image processing apparatus comprising:
a processor; and
a memory configured to store instructions that, when executed by the processor, implement:
a specifying unit configured to specify colors used for objects in color data;
a first determination unit configured to determine one of the specified colors as a base color;
a second determination unit configured to determine another of the specified colors as an accent color;
an application unit configured to convert the color data into monochrome data by applying a first gray scale value to the one of the specified colors determined as the base color and applying a second gray scale value that is distinguishable from the first gray scale value and has a gray scale value darker than the first gray scale value to the another of the specified colors determined as the accent color; and
a first acquiring unit configured to acquire information indicating numbers of use of the specified colors,
wherein said first determination unit determines, based on the acquired information, the color with the highest number of use as the base color from among the specified colors, and wherein said second determination unit determines, based on the acquired information, the color with the lowest number of use as the accent color from among the specified colors.

2. The image processing apparatus according to claim 1, wherein the memory is further configured to store instructions that, when executed by the processor, implement a display unit configured to display the monochrome data.

3. An image processing apparatus comprising:
a processor; and
a memory configured to store instructions that, when executed by the processor, implement:
a specification unit configured to specify colors used for objects in color data;
a first determination unit configured to determine one of the specified colors as a base color;
a second determination unit configured to determine another of the specified colors as an accent color;
an application unit configured to convert the color data into monochrome data by applying a first gray scale value to the one of the specified colors determined as the base color and applying a second gray scale value that is distinguishable from the first gray scale value and has a gray scale value darker than the first gray scale value to the another of the specified colors determined as the accent color; and
a second acquiring unit configured to acquire saturations of the specified colors,
wherein said second determination unit determines the color with the highest saturation as the accent color from among the specified colors, and wherein said first determination unit determines the color with the lowest saturation as the base color from among the specified colors.

4. An image processing apparatus comprising:
a processor; and
a memory configured to store instructions that, when executed by the processor, implement:
a specification unit configured to specify colors used for objects in color data;
a first determination unit configured to determine one of the specified colors as a base color;
a second determination unit configured to determine another of the specified colors as an accent color;
an application unit configured to convert the color data into monochrome data by applying a first gray scale value to the one of the specified colors determined as the base color and applying a second gray scale value that is distinguishable from the first gray scale value and has a gray scale value darker than the first gray scale value to the another of the specified colors determined as the accent color,
a first acquiring unit configured to acquire information indicating numbers of the specified colors;
a second acquiring unit configured to acquire saturations of the specified colors; and
a third determination unit configured to determine another of the specified colors as a main color,
wherein said first determination unit determines, based on the acquired information, the color with the highest number of use as the base color from among the specified colors, and
wherein said second determination unit determines the color with the highest saturation acquired by said second acquiring unit as the accent color from among the specified colors other than the color determined as the base color,
wherein said third determination unit determines colors other than the colors determined as the base color and accent color as a main color, and
wherein said application unit applies a third gray scale value to the main color that has a gray scale value that is less than the first gray scale value applied to the base color.

5. An image processing apparatus comprising:
a processor; and
a memory configured to store instructions that, when executed by the processor, implement:
an specification unit configured to specify colors used for objects in color data;
a first determination unit configured to determine one of the specified colors as a base color;
a second determination unit configured to determine another of the specified colors as an accent color;
an application unit configured to convert the color data into monochrome data by applying a first gray scale value to the one of the specified colors determined as the base color and applying a second gray scale value that is distinguishable from the first gray scale value and has a gray scale value darker than the first gray scale value to the another of the specified colors determined as the accent color,
a first acquiring unit configured to acquire information indicating numbers of the specified colors;
a second acquiring unit configured to acquire saturations of the specified colors; and
a third determination unit configured to determine another of the specified colors as a main color,
wherein said second determination unit determines, based on the acquired information, the color with the lowest number of use as the accent color from among the specified colors, and
wherein said first determination unit determines the color with the lowest saturation acquired by said second acquiring unit as the base color from among the specified colors other than the color determined as the accent color,
wherein said third determination unit determines colors other than the colors determined as the base color and accent color as a main color, and
wherein said application unit applies a third gray scale value to the main color that has a gray scale value that is less than the first gray scale value applied to the base color.

6. The image processing apparatus according to claim 4, wherein the memory is further configured to store instructions that, when executed by the processor, implement a first obtaining unit configured to obtain information about gray scale values to be applied to the base color, the accent color, and the main color,
wherein said application unit sets up the gray scale values applied to the colors based on the information about the gray scale values that is obtained by said first obtaining unit.

7. The image processing apparatus according to claim 5, wherein the memory is further configured to store instructions that, when executed by the processor, implement a first obtaining unit configured to obtain information about gray scale values to be applied to the base color, the accent color, and the main color,
wherein said application unit sets up the gray scale values applied to the colors based on the information about the gray scale values that is obtained by said first obtaining unit.

8. The image processing apparatus according to claim 4, wherein the memory is further configured to store instructions that, when executed by the processor, implement:
a counting unit configured to count a number of colors that are specified by said specifying unit; and
a holding unit configured to hold a number of determining target colors, wherein said application unit functions only in a case where the number of colors counted by said counting unit is equal to or less than the number of determining target colors held by said holding unit.

9. The image processing apparatus according to claim 5, wherein the memory is further configured to store instructions that, when executed by the processor, implement:
 a counting unit configured to count a number of colors that are specified by said specifying unit; and
 a holding unit configured to hold a number of determining target colors,
 wherein said application unit functions only in a case where the number of colors counted by said counting unit is equal to or less than the number of determining target colors held by said holding unit.

10. The image processing apparatus according to claim 8, wherein the memory is further configured to store instructions that, when executed by the processor, implement a second obtaining unit configured to obtain the number of determining target colors.

11. The image processing apparatus according to claim 9, wherein the memory is further configured to store instructions that, when executed by the processor, implement a second obtaining unit configured to obtain the number of determining target colors.

12. A control method for an image processing apparatus, the control method comprising:
 specifying colors used for objects in color data;
 determining one of the specified colors as a base color;
 determining another of the specified colors as an accent color;
 converting the color data into monochrome data by applying a first gray scale value to the one of the specified colors determined as the base color and applying a second gray scale value that is distinguishable from the first gray scale value and has a gray scale value darker than the first gray scale value to the another of the specified colors determined as the accent color; and
 acquiring information indicating numbers of use of the specified colors,
 wherein the color with the highest number of use is determined, based on the acquired information, as the base color from among the specified colors, and the color with the lowest number of use is determined, based on the acquired information, as the accent color from among the specified colors.

* * * * *